United States Patent [19]

Rothrock

[11] Patent Number: 4,643,212

[45] Date of Patent: Feb. 17, 1987

[54] HOT LIQUID THERMAL ENERGY STORAGE TANK AND METHOD

[75] Inventor: Elmer W. Rothrock, Hinsdale, Ill.

[73] Assignee: Chicago Bridge & Iron Company, Oak Brook, Ill.

[21] Appl. No.: 594,324

[22] Filed: Mar. 28, 1984

[51] Int. Cl.$^4$ .................................... E03B 11/00
[52] U.S. Cl. ........................ 137/1; 137/592; 165/104.19; 126/437; 60/659; 220/426; 220/428
[58] Field of Search ............ 165/104.19, 104.11; 60/659; 137/590, 592; 220/428, 426; 126/437, 362

[56] References Cited

U.S. PATENT DOCUMENTS

3,109,294 11/1963 Messer ............................ 220/428
3,563,305 2/1971 Hay ............................ 165/104.19
4,158,384 6/1979 Brautigam ............................ 165/104.11

Primary Examiner—Albert W. Davis, Jr.
Attorney, Agent, or Firm—Marshall, O'Toole, Gerstein, Murray & Bicknell

[57] ABSTRACT

An enclosed storage tank for a hot liquid comprising a metal shell with a flat metal bottom, a vertical cylindrical metal side wall and a metal roof; a vertical cylindrical internal wall, supported by the tank bottom, axially located in the tank to provide an annular space between the tank side wall and the internal wall; openings to provide gravity flow of liquid between both sides of the internal wall; and the internal wall comprising a plurality of interconnected insulating blocks constituting thermal insulation surrounded by a covering layer impervious and corrosion resistant to hot liquid to be stored in the tank. A method of storing thermal energy as a hot liquid in the tank is also disclosed.

23 Claims, 18 Drawing Figures

HOT LIQUID THERMAL ENERGY STORAGE TANK AND METHOD

This invention relates to storage of liquids. More particularly, this invention is concerned with a liquid storage tank for storing thermal energy in the form of a high temperature liquid, such as a molten salt.

BACKGROUND OF THE INVENTION

Liquids have been stored for many years in metal tanks and vessels at ambient temperature. In recent years there has been substantial interest in storing thermal energy in the form of a hot liquid, such as hot water, oil or a molten salt, for subsequent use as needed or appropriate. The energy so stored can be obtained from a power generating plant for subsequent electric generation or it can be obtained from a solar energy collector and used later for heating purposes or electric power generation.

A thermal energy storage tank will generally always be full of liquid. The liquid, however, will be removed hot from the tank when energy is needed and after the heat is removed the cold liquid will be returned to the tank for storage. The liquid in the tank will accordingly be at two different temperatures a substantial amount of the time with a cold layer stratified beneath an upper hot layer. When thermal energy is available to heat the liquid, the cold liquid is removed from the lower part of the stored volume, heated and then returned to the upper part of the tank. In this way the entire stored volume can be heated. Thus, the volume ratios of the cold liquid layer to the total volume can vary between 0 and 1.

Although spherical tanks can be used they are costly. A clear cost advantage is inherent in a flat bottom cylindrical tank, principally because the load can be transferred directly to the supporting earth.

Unless the storage tank is suitably insulated, substantial heat would be lost by convection, conduction and radiation from the hot liquid to the surrounding air. The insulation is desirably placed on the outside of the tank because functionally suitable insulation for use on the inside tank wall may not be available or, if available, the cost would be too great. The result of external insulation is that the hot liquid directly contacts the tank side wall. While such direct liquid contact is acceptable with moderately heated liquids, it is undesirable to have high temperature liquids, such as molten salts above 400° C., in contact with the tank metal shell. At a moderately high temperature, the weakening effect on the wall strength is countered by increasing the design thickness of the shell but for higher temperatures (>700° C.) the weakening effect can create a hazardous condition. Also, severe temperature stresses are produced in the metal side wall or shell as a result of the thermocline where the hot and cold layers merge, and from the temperature difference between the cylindrical shell and bottom.

To minimize capital costs, it is desirable to fabricate a storage tank from the least expensive metal. However, molten salts at high temperatures, i.e. above 550° C., are very corrosive to carbon steel and even stainless steels. While a layer of expensive refractory insulation on the inside of the tank might be considered a way to keep the metal shell at a lower temperature and out of contact with it, such an arrangement places the tank in jeopardy if a hole or fracture in the insulation permits the hot liquid to contact and heat the metal tank shell. Furthermore, many insulation materials are readily corroded, and thus are not useable, when placed in direct contact with a molten salt.

From the above discussion it is clear that a need exists for an improved storage tank for storing thermal energy in the form of a high temperature liquid, particularly a molten salt.

SUMMARY OF THE INVENTION

According to the invention, an enclosed liquid storage tank, desirably for storing thermal energy as a hot liquid, is provided comprising a metal shell with a flat metal bottom, a vertical cylindrical metal side wall and a metal roof; a vertical cylindrical internal wall, supported by the tank bottom, axially located in the tank to provide an annular space between the tank side wall and the internal wall; means to provide gravity flow of liquid between both sides of the internal wall; and with the internal wall comprising a plurality of interconnected insulating blocks constituting thermal insulation surrounded by a covering layer impervious and corrosion resistant to liquid to be stored in the tank.

According to a second aspect of the invention, a method is provided comprising feeding a hot liquid into an enclosed liquid storage tank having a metal shell with a flat metal bottom, a vertical cylindrical internal wall, supported by the tank bottom, axially located in the tank to provide an annular space between the tank side wall and the internal wall; ports or openings in the internal wall along the flat metal bottom to provide gravity flow of liquid between both sides of the internal wall; and the internal wall comprising a plurality of interconnected insulating blocks constituting thermal insulation surrounded by a covering layer impervious and corrosion resistant to liquid to be stored in the tank, with said feeding continuing until the tank contains a layer of hot liquid within the internal wall and at least a layer of cold liquid in the annular space and along the flat metal bottom at least for the depth of the ports; removing hot liquid from the tank in a volume equal to cold liquid fed to the tank so that the total liquid volume in the tank is about constant and substantially fills the tank; and removing cold liquid from the tank in a volume equal to hot liquid fed to the tank until the layer of cold liquid at the bottom of the tank has a depth adequate for the thermocline to be above the ports so that thereby the hot liquid cannot flow from within the space surrounded by the internal wall, through the ports and into the annular space. The tank would be initially charged with "cold liquid" to fill the annular space, then the heating cycle could begin.

The covering layer used on the blocks protects the insulation against the corrosive action of the hot liquid, such as a molten salt. Furthermore, since the inner wall functions as a thermal barrier, liquid in the annular space is at a substantially lower temperature than the main body of liquid in the tank, even when such liquid is heated to a maximum predetermined temperature. This permits the tank wall to be fabricated of a less expensive metal than would otherwise be required and eliminates the hazard which would result from the weakening effect of the exceptionally high (>700° C.) temperatures. The tank bottom can also be fabricated of less expensive metal since a layer of relatively cold liquid is maintained at the bottom at all times. This relatively cold layer has a depth great enough to keep the thermocline between the hot liquid layer and the cold liquid layer higher than or above the ports or openings at the bottom of the internal wall which permit liquid flow between the annular space and the space surrounded by the internal wall. As a result, hot liquid cannot flow into the annular space.

The means to provide gravity flow of liquid between both sides of the internal wall can constitute openings at the bottom of the internal wall.

Each of the blocks can be substantially of the same shape and size. Thus, the blocks can have rectangular vertical front and rear covering layers. The blocks can also have curved front and rear layers. Regardless of their shape and size the blocks will usually be of about uniform thickness.

The covering layer of the blocks is desirably a metal which is stable at high temperatures and which is not corroded by the molten salt.

The inner wall can be fabricated of a plurality of rings or courses set one on top of a lower course and with each ring comprising a plurality of blocks in end-to-end arrangement.

To further limit heat leak, the external surface of the tank side wall and roof can be thermally insulated. In addition, the tank bottom can be supported on a thermally insulated foundation although moderate heat transfer is desirable to keep the tank bottom from becoming too hot from the stored liquid.

A vent conduit can communicate with the interior of each block and extend to above the maximum liquid level storage capacity of the tank to prevent the blocks from ballooning due to internal gas expansion when heated. A single vent conduit can be arranged to communicate with a plurality of blocks. Furthermore, each block in communication with the conduit can be in a separate ring.

The covering layer of the blocks can include flat top and bottom plates. Also, the blocks in each ring can be staggered with respect to blocks in adjacent rings or they can be assembled in a columnar arrangement.

DETAILED DESCRIPTION OF THE DRAWINGS

To the extent it is reasonable and practical, the same or similar elements which appear in the various views of the drawings will be identified by the same numbers.

Figure 1:
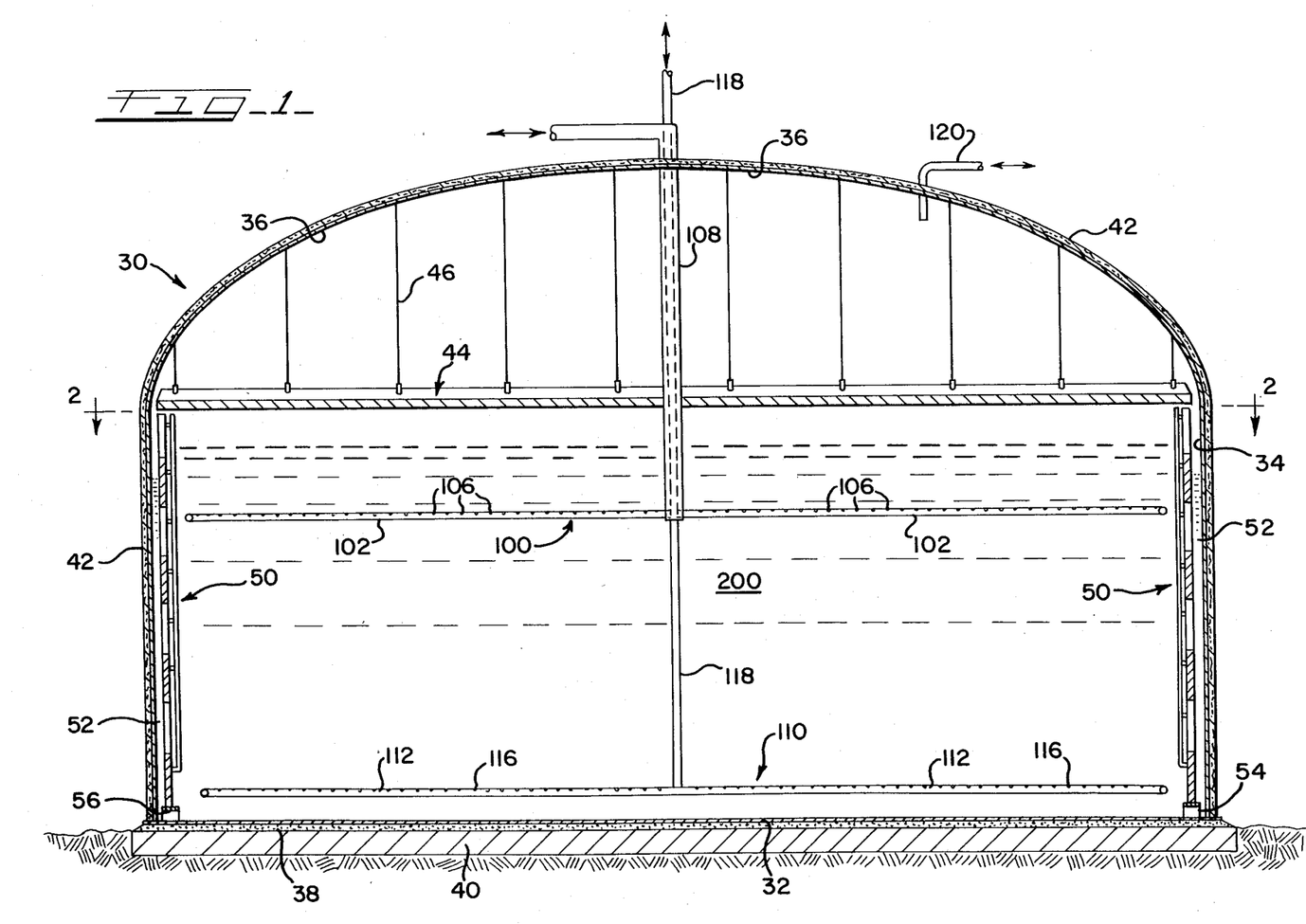
FIG. 1 is a vertical sectional view through a liquid storage tank according to the invention.

The enclosed hot liquid storage tank 30 shown in FIG. 1 has a flat metal circular bottom 32, a vertical circular cylindrical metal wall 34 joined at its lower edge to bottom 32, and a domed metal roof 36 supported by wall 34. Bottom 32 rests on a layer of granular material 38, such as sand, on top of insulating concrete foundation 40. Insulation 42 covers the exterior surfaces of wall 34 and roof 36. An insulated ceiling 44 is suspended by rods 46 from roof 36 at a location above the liquid capacity of the tank.

Insulating freestanding internal wall 50 is located inside of tank 30. Internal wall 50 is vertically and axially arranged in the tank so as to be spaced inwardly a uniform distance from outer wall 34 thereby providing annular space 52 between the two walls. The internal wall 50 accordingly has an essentially vertical circular cylindrical shape.

Internal wall 50 has a plurality of vertical spaced apart gusset plates 54 at the lower end on which ring plate 56 is supported. The open space between adjacent spaced apart gusset plates 54 permits liquid in the tank to flow into and out of annular space 52 from the central tank volume surrounded by internal wall 50, thus allowing the two spaces to remain in hydrostatic equilibrium.

Figures 3, 4, 6, 7, 8:
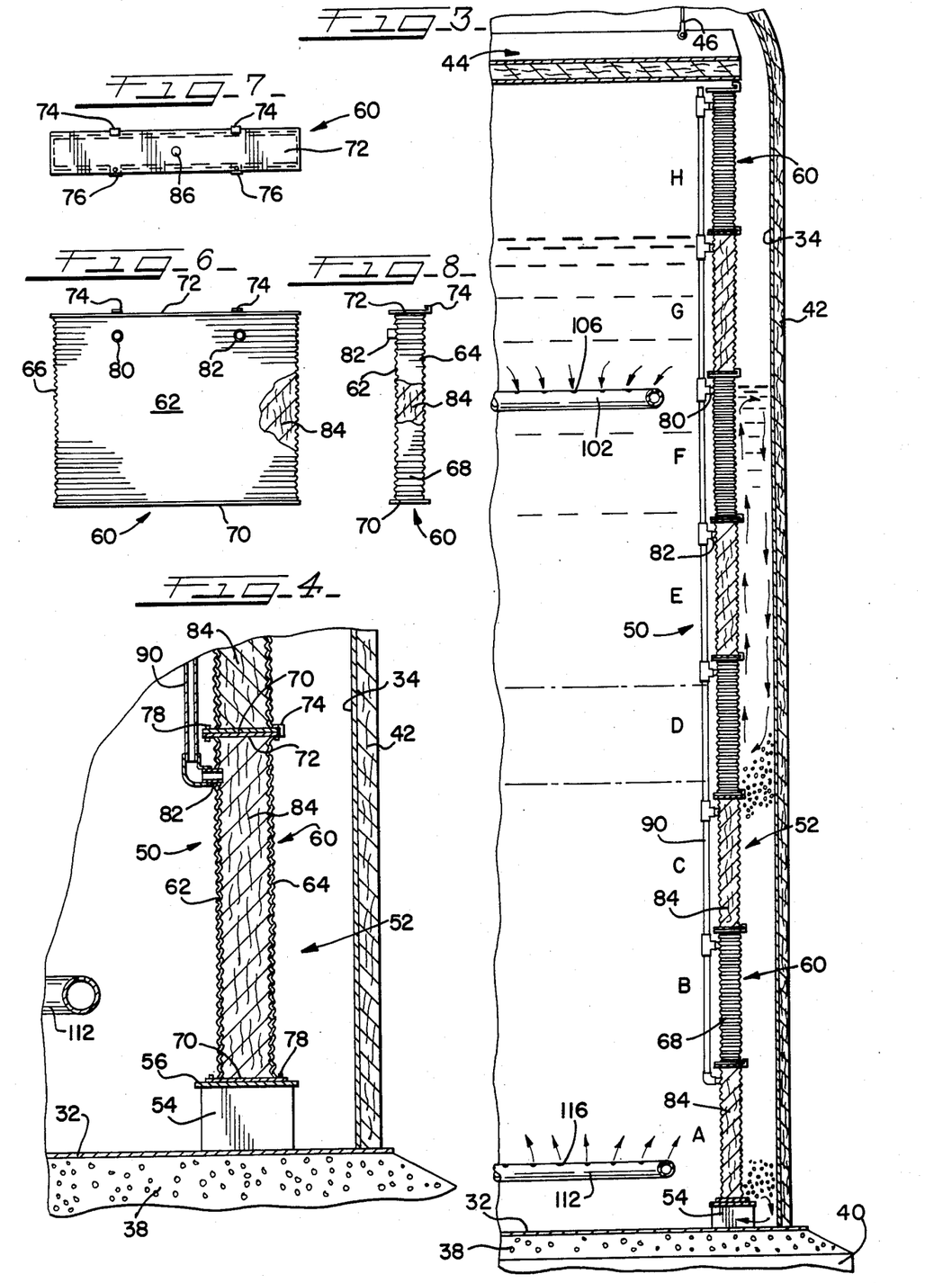
FIG. 3 is an enlarged vertical sectional view of a side of the tank shown in FIG. 1.
FIG. 4 is an enlarged vertical sectional view of the lower portion of the tank side shown in FIG. 3.
FIG. 6 is a front elevational view, partially broken away, of an insulating block used in forming the tank internal wall shown in FIGS. 1 to 5.
FIG. 7 is a plan view of the insulating block shown in FIG. 6.
FIG. 8 is a side elevational view, partially broken away, of the insulating block shown in FIGS. 6 and 7.
Figure 5:
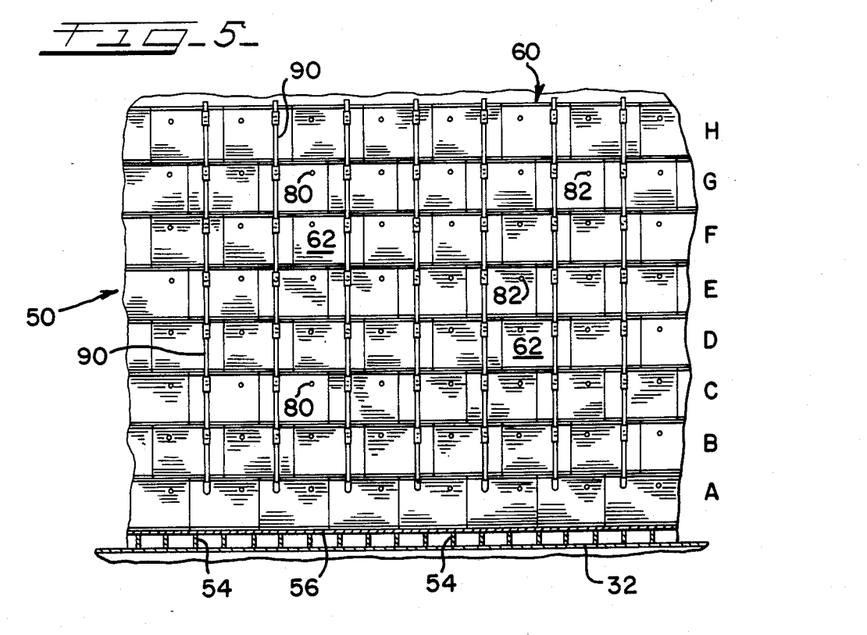
FIG. 5 is an elevational view of a portion of the internal wall in the tank shown in FIGS. 1 to 4.

The internal wall 50 comprises a series of rings or courses set one on top of a lower ring. Thus, as shown in FIGS. 3 and 5, the wall 50 includes eight rings A, B, C, D, E, F, G and H. While the rings are shown of equal height, they can be of different heights.

Each of the rings or courses A to G is formed of a plurality of interconnected insulating blocks 60 arranged in end-to-end abutting arrangement. While the blocks in adjacent rings are shown in staggered or offset arrangement, they can be positioned in direct alignment with their edges in vertical linear position, thereby placing the blocks in a columnar arrangement with each column adjoining two other columns.

Each insulating block 60 includes a metal covering layer which is impervious and corrosion resistant to liquid to be stored in the tank. The block 60 has a metal front wall 62, a metal rear wall 64, and metal end walls 66 and 68 (FIGS. 6 to 8). The described walls are joined to flat metal bottom plate 70 and flat metal top plate 72. Two or more clip angles 74 are welded to the rear of top plate 72 in such a way as to receive the rear edge of the bottom plates 70 of blocks in the next higher ring or course. Two or more holes 76 are positioned along the front edge of top and bottom plates 70 and 72 so that bolts 78 can be used to connect stacked blocks together, whether the blocks are staggered or in columnar arrangement, and to connect the blocks to ring plate 56.

Seams between adjoining blocks 60 need not be tightly sealed. Liquid flowing through small leaks will mix with liquid in the annular space 52 and be of no consequence.

The front wall 62 of each block 60 contains two stub pipes 80 and 82 which are in fluid communication with the interior of the block. Each block 60 is completely filled with insulation 84, which can be supplied through orifice 86 in top plate 72. After the insulation is cured or solidified, orifice 86 can be plugged.

Desirably, a foamed refractory with a low thermal conductivity is used for insulation 84. The inner wall is anchored to avoid floatation since the density of the blocks 60 would be less than some thermal energy storage liquids, such as a molten salt. A dense refractory is preferably avoided because it would have a thermal conductivity exceeding that of the molten salt, making it a poor insulator. Regardless of the type of insulation used, it must have adequate compressive strength to resist the hydrostatic pressure to which the blocks 60 are subjected in the tank. This is because the shells of the blocks are made of thin flexible metal sheets which transfer hydrostatic loads to the insulation.

The insulating blocks 60 are arranged in rings, or courses, as shown in the drawings, starting with the first or lowermost ring A which is joined to ring plate 56 and continuing upwardly. Obviously, assembly of one or more successive rings can be started before a lower ring is fully assembled. When the rings are assembled so that the blocks in adjacent rings are staggered with respect to each other, the stub pipes 80 and 82 in each block will also be staggered. As a result, the stub pipes become arranged in a series of vertical lines with stub pipes 80 and 82 in alternating arrangement. The stub pipes in such lines are interconnected by a conduit 90 which extends above the top of internal wall 50. Conduit 90 is open at the top end but is otherwise closed off against liquid stored in the tank. The purpose of conduits 90 is to permit any gases in blocks 60 to be vented out so that the blocks do not balloon when a hot liquid is stored in the tank. Obviously, if the blocks 60 are put in a vertical columnar arrangement, there would be no need for each block 60 to have two stub pipes 80 and 82 since one will suffice.

Figure 2:
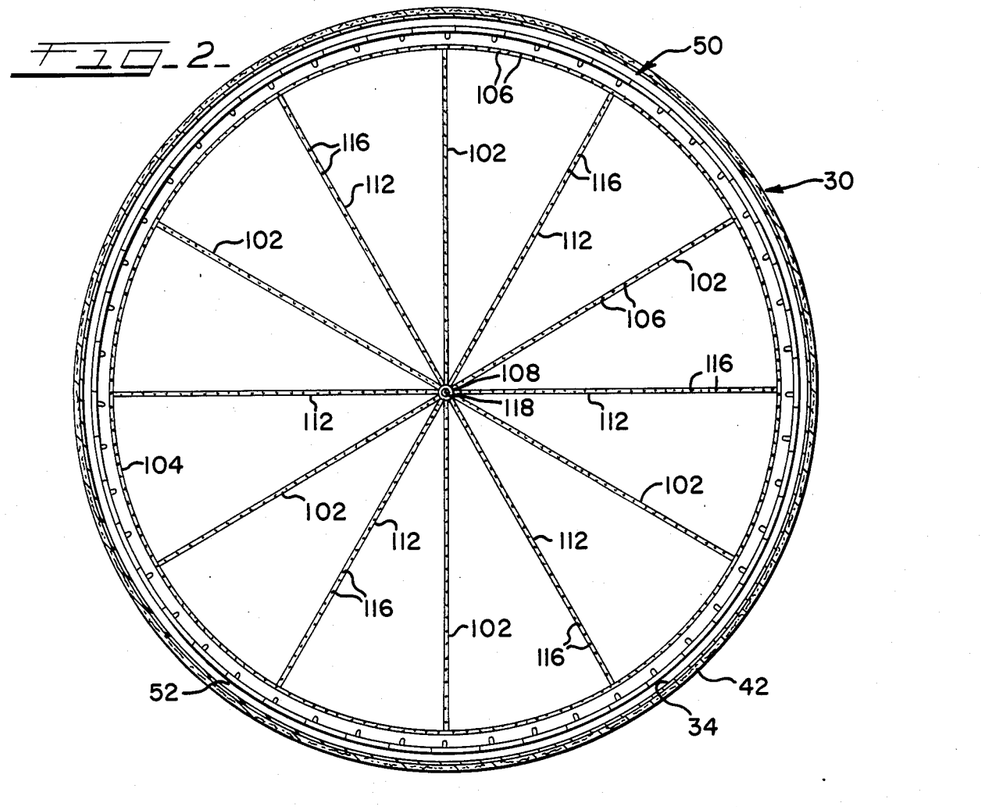
FIG. 2 is a sectional view taken along the line 2—2 of FIG. 1.

A horizontal tubular sparger 100 (FIGS. 1 and 2), having equally spaced apart radial arms 102 which communicate with ring tube 104, is mounted in the upper internal space of tank 30. Holes 106 are located in arms 102 and ring 104 so that liquid can be fed into, and be withdrawn from, the upper liquid storage space by means of sparger 100 and conduit 108. The sparger system permits liquid entry and removal with reduced turbulence, so as not to disturb the thermocline. The lower end of vertical conduit 108 communicates with arms 102 and the upper end extends through roof 36. Similarly, a horizontal tubular sparger 110 having arms 112 joined to a ring (not shown but like the ring 104), is mounted in the lower internal space of the tank 10. Holes 116 are located in arms 112 and the ring so that liquid can be fed into, and be withdrawn from, the lower liquid storage space by means of a sparger 110 and conduit 118. The lower end of vertical conduit 118 communicates with arms 112 and the upper part of conduit 118 runs through conduit 108 to the tank exterior.

Conduit 120 (FIG. 1) penetrates tank roof 36 and provides a means for equalizing pressure in the tank with the external pressure. When desirable, internal flow of gas by means of conduit 120 is also feasible.

The storage tank described in conjunction with FIGS. 1 to 8 is primarily useful for storing thermal energy in the form of a hot liquid, particularly a molten salt at a maximum temperature of about 800° to 1050° C. For storing such a high temperature liquid, which often is corrosive, it is contemplated that the metal shells of blocks 60 and the spargers 100 and 110 can be made of Ni-Cr-Fe Alloy 600. The tank bottom 32, side wall 34 and roof 36 can be made of a stainless steel, such as Type 304.

During initial filling, there must be sufficient cold liquid in the tank to fill the annular space and keep the bottom covered. At the start the liquid should not be above 550° C. to protect the tank bottom against an excessively high temperature during initial filling. As liquid is fed to the tank it also flows between gussets 54 into annular space 52. Since the cold liquid protects the bottom and the annular space, the temperature of the liquid feed stream can then be raised, such as to 1050° C. Hot liquid, such as hot molten salt, can then be fed to the tank 30 by sparger 100 until the hot liquid level in the tank reaches the maximum design storage capacity of the tank.

When the hot liquid is to be used, it can be withdrawn by sparger 100. After the desired amount of thermal energy has been extracted from the withdrawn hot liquid, the cooled liquid can be returned to the tank through sparger 110. This cycle can be continued until part or all of the hot liquid has been removed from the tank. At such time as a means to heat the cold liquid in the tank becomes available, the cold liquid can be withdrawn through sparger 110, then heated, and the hot liquid returned to the upper part of the tank through sparger 100. This cycle can continue until part or all of the liquid in the tank is heated except for the liquid below sparger 110.

The liquid in annular space 52 will be at a lower temperature than the main body of liquid in hot well 200 (FIG. 1). Thus, when the tank is fully charged with a hot molten salt at 950° C., the molten salt in the annular space will be at a maximum of about 550° C. The thermal resistance of the thermal barrier internal wall 50 results in a lower temperature in the annular space 52 which is acceptable for the container wall but which is high enough to maintain the salt in a molten state. The tank wall 34, being at a lower temperature, can accordingly be made of stainless steel, which is less costly than the alloy needed for blocks 60. Furthermore, the bottom 32 also will be at a substantially lower temperature because about two feet or so of relatively cold liquid, such as at 550° C., is maintained in the tank at all times. This permits the bottom to be made of stainless steel rather than an expensive alloy. Furthermore, the supporting media below the tank should have a sufficiently high thermal conductivity so that a suitable temperature gradient can be maintained below sparger 110. The described arrangement thus subjects only the inner surface of the internal wall and the internal distribution piping to direct contact with the highest temperature molten salt.

Because the volume of molten salts increases with temperature, when the tank is fully charged with a hot molten salt at 950° C., it could have a depth of thirty-six feet, although the depth of liquid in the annular space 52, being cooler, would be about thirty feet (FIG. 3). Similarly, when thermally discharged, the molten salt at about 550° C. would be about thirty-one feet deep while the partially solidified molten salt in the annular space at about 300° to 330° C. would be about twenty-nine feet deep.

It is not considered feasible to simply apply insulation directly to the inside of tank wall 34, in place of the use of internal wall 50, because the wall 34 could be threatened if a crack or opening in the insulation allowed the high temperature storage liquid to come into direct contact with that wall. By use of an internal wall 50 small leaks of hot liquid are diffused into the lower temperature molten salt in the annular space.

Figure 9:
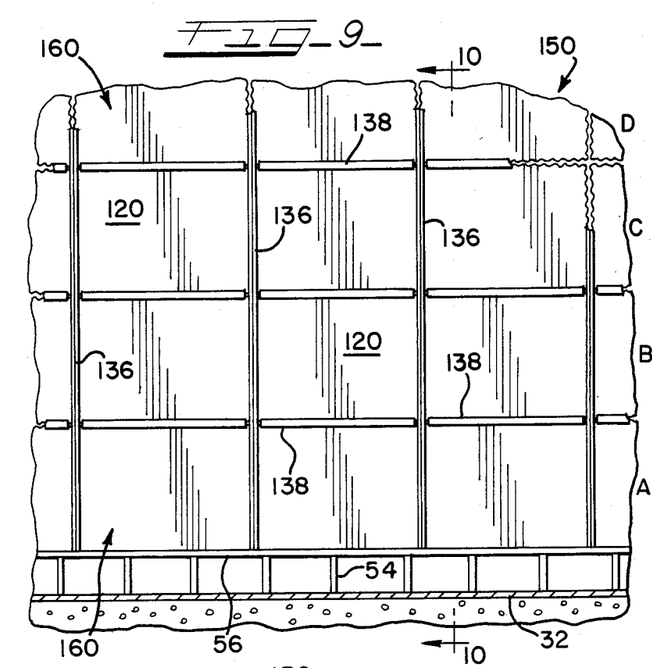
FIG. 9 is an elevational view of a second embodiment of internal wall provided by the invention.
Figure 10:
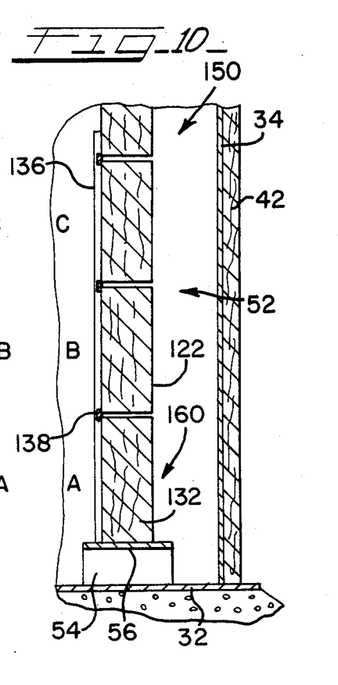
FIG. 10 is a sectional view taken along the line 10—10 of FIG. 9.
Figures 11, 12:
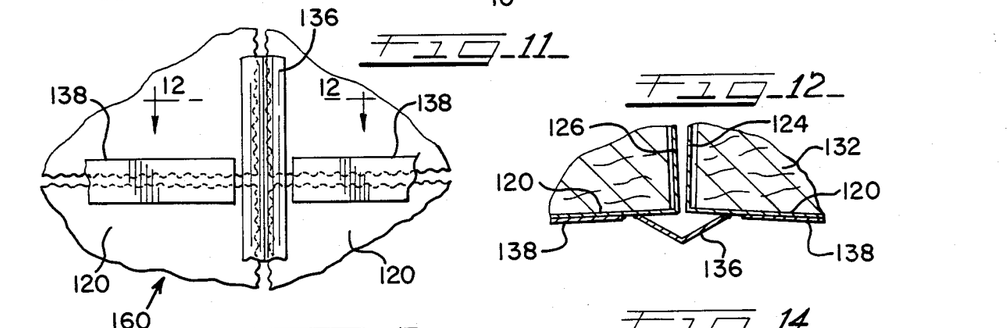
FIG. 11 is a partial elevational view of the internal wall shown in FIGS. 9 and 10.
FIG. 12 is a sectional view taken along the line 12—12 of FIG. 11.
Figure 13:
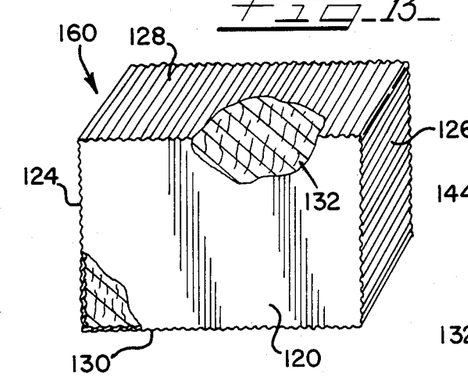
FIG. 13 is an isometric view of the insulating block used in forming the tank internal wall shown in FIGS. 9 to 12.

A second embodiment of the invention is illustrated by FIGS. 9 to 13. The insulating block 160 (FIG. 13) used in this embodiment has a flat or curved vertical metal front wall 120 and a flat or curved vertical metal rear wall 122 (FIG. 10). The two vertical metal end walls 124, 126, the metal top 128 and the metal bottom 130 are all corrugated lateral to the front and rear walls. The block 160 is filled with a refractory insulating material 132 and then is evacuated to a low pressure. This makes it unnecessary to vent the blocks when they become hot in use.

FIGS. 9 to 12 illustrate an internal wall 150 formed by a series of courses or rings of blocks 160 set one on top of a lower ring. While FIGS. 9 to 10 only show rings A to D, it should be understood that as many rings will be used as are needed for the intended purpose. Since each ring has the same number of blocks, and because the blocks are of identical size and shape, the blocks in the sequence of progressively higher rings can be arranged columnar as shown in FIG. 9. The vertical joints between adjacent blocks are covered by an angle strip 136 and the strip edges are welded to the respective blocks. Similarly, flat horizontal strips 138 are positioned to span the horizontal joints between blocks and then are welded to the blocks. The ends of horizontal strips 138 terminate a short distance from the vertical strips 136 so that expansion and contraction can be accommodated. While this provides small gaps in the wall, the small amount of liquid leaking through is inconsequential.

Figure 14:
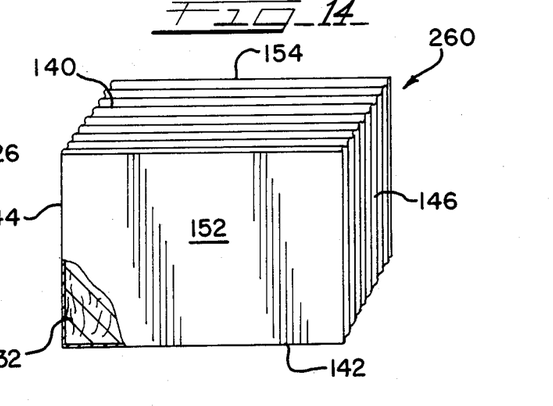
FIG. 14 is an isometric view of an insulating block with the sides corrugated parallel to the front and back, rather than lateral to the front and back as shown in FIG. 13.

FIG. 14 illustrates an insulating block 260 which is quite similar to block 160. However, block 260 has metal top and bottom walls 140, 142 and metal end walls 144, 146 with the corrugations running parallel to the flat or curved front and rear walls 152 and 154. Block 260 also contains refractory insulation 132.

A third embodiment of internal wall 250 is illustrated by FIGS. 15 to 18. The internal wall 250 is formed of insulating blocks 260 shown in FIG. 18 to have a rectangular flat metal front wall 170, a *single-curved* metal rear wall 172 curved to the radius of the inner wall 250, corrugated metal horizontal top and bottom walls 174, 176 and corrugated metal vertical end or side walls 178, 180. The corrugations in the top, bottom and end walls are all parallel to the front wall 170. A cast refractory insulation material 132 fills the space inside each block 260.

Figures 15, 16:
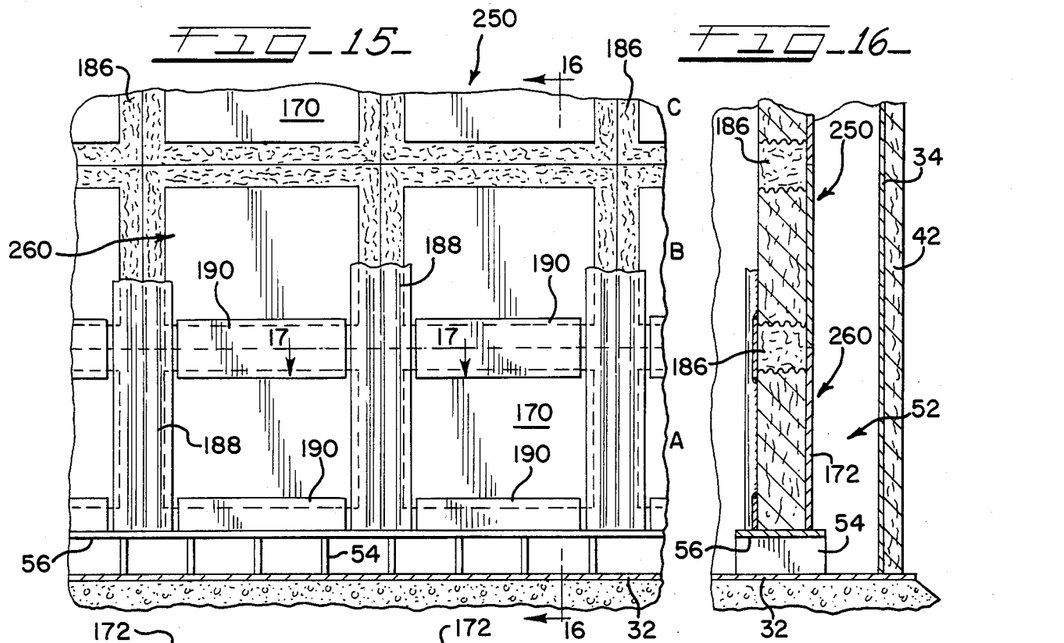
FIG. 15 is an elevational view of a third embodiment of internal wall provided by the invention.
FIG. 16 is a sectional view taken along the ine 16—16 of FIG. 15.
Figures 17, 18:
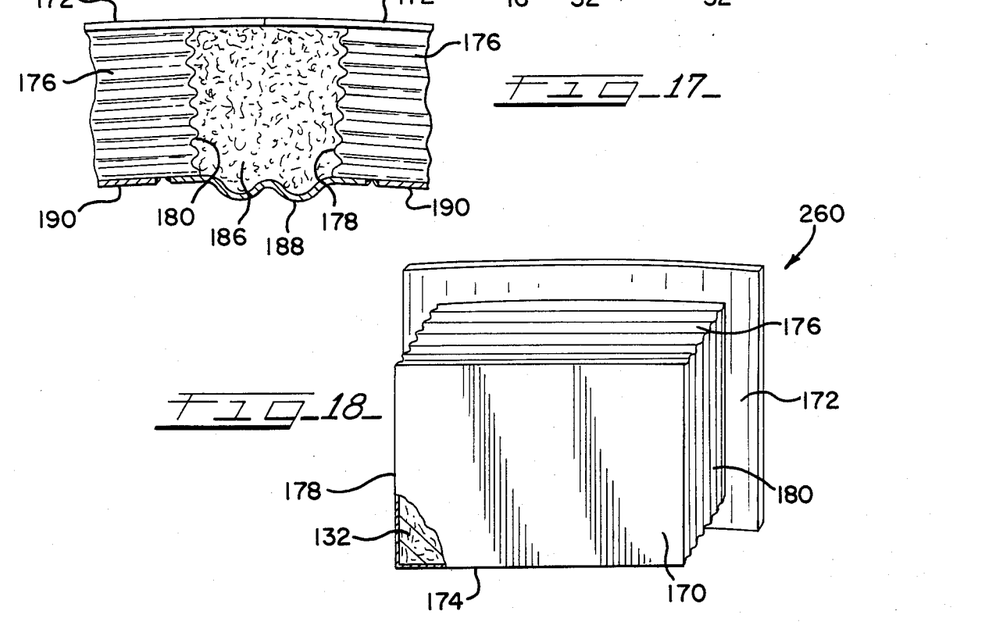
FIG. 17 is a sectional view taken along the line 17—17 of FIG. 15.
FIG. 18 is an isometric view of the insulating block used in forming the tank internal wall shown in FIGS. 15 to 17.

As is clearly shown in FIG. 18, the single-curved rear wall 172 is substantially larger in length and height than front wall 170. Accordingly, in forming inner wall 250, the blocks 260 are arranged in rings or courses A, B, C, etc. with the vertical edges of each block wall 172 in abutting contact with the vertical edges of adjacent blocks. Those abutting edges are then welded together by a continuous weld. As shown in FIG. 15, the blocks 260 are arranged in each succeeding higher ring so as to be centered directly above a block in the lower ring with the result being that the blocks are in columnar arrangement as well as in rings. The lower-most course of blocks 260 has the lower edge of back wall 172 supported on and welded to the top of ring plate 56. Additionally, all of the horizontal girth seam joints between courses or rings are welded together. Those joints are formed by abutting contact between the top edge of back wall 172 of a block 260 in a lower course and the lower edge of a back wall 172 of a block in a next higher course.

An internal wall produced as described will be leak tight. However, to complete the thermal barrier, the vertical and horizontal channels between front walls 170 in the courses and columns of blocks is filled with a suitable deformable refractory insulating material 186. After insulating material 186 is put in place, vertical corrugated metal strips 188 are positioned over the insulation and welded to the adjoining blocks 260. Similarly, flat metal strips 190 are positioned over the horizontal rows of insulation 186 and welded to the blocks. Desirably, a small gap is provided between the vertical strips 188 and the ends of the horizontal strips 190 to permit expansion.

The foregoing detailed description has been given for clearness of understanding only, and no unnecessary limitations should be understood therefrom, as modifications will be obvious to those skilled in the art.

What is claimed is:

1. An enclosed liquid storage tank for storing a liquid at a temperature above 400° C. comprising:
    a metal shell with a flat metal bottom, a vertical cylindrical metal side wall and a metal roof;
    a vertical circular cylindrical essentially freestanding internal wall, supported by the tank bottom, axially located in the tank to provide an annular space between the tank side wall and the internal wall;
    means to provide gravity flow of liquid between both sides of the internal wall; and
    the internal wall comprising a plurality of interconnected insulating blocks constituting thermal insulation surrounded by a covering layer impervious and corrosion resistant to liquid to be stored in the tank.

2. An enclosed liquid storage tank according to claim 1 in which the means to provide gravity flow of liquid between both sides of the internal wall includes openings at the bottom of the internal wall.

3. An enclosed liquid storage tank according to claim 1 in which the covering layer is metal.

4. An enclosed liquid storage tank according to claim 1 in which the blocks are largely of the same shape and size.

5. An enclosed liquid storage tank according to claim 1 in which the blocks have vertical front and rear covering layers and the blocks are of about uniform thickness.

6. An enclosed liquid storage tank according to claim 1 in which the inner wall comprises a plurality of rings or courses set one on top of a lower ring and each ring comprises a plurality of blocks in end to end arrangement.

7. An enclosed liquid storage tank according to claim 1 in which the external surface of the tank side wall and roof are thermally insulated and the tank bottom is supported on a thermally insulated foundation.

8. An enclosed liquid storage tank according to claim 1 including a thermally insulating deck suspended from the tank roof and located above the maximum liquid level storage capacity of the tank.

9. An enclosed liquid storage tank according to claim 6 in which the covering layer of the blocks includes flat top and bottom plates, the blocks in each ring are staggered with respect to blocks in adjacent rings, and adjoining top and bottom plates of adjacent rings are joined together.

10. An enclosed liquid storage tank according to claim 9 in which the block top and bottom plates are metal and the vertical walls of each block are corrugated metal.

11. An enclosed liquid storage tank according to claim 12 in which the block rear layer is wider and higher than the front layer, the blocks are arranged in rings so that the rear layer edges of adjoining blocks in the same course, and in adjoining courses, are abutted and welded together, deformable insulation fills the vertical space between adjacent sides of adjoining blocks and the horizontal space between adjacent top and bottom layers of adjoining blocks, and the deformable insulation is covered by metal strips joined to the blocks.

12. An enclosed liquid storage tank according to claim 14 in which the edges of adjoining blocks are covered by metal strips.

13. An enclosed liquid storage tank according to claim 12 in which some of the metal strips are vertical and expandable horizontally.

14. A method comprising:
feeding a hot liquid at a temperature above 400° C. into an enclosed liquid storage tank having a metal shell with a flat metal bottom, a vertical cylindrical internal wall, supported by the tank bottom, axially located in the tank to provide an annular space between the tank side wall and the internal wall; ports or openings in the internal wall along the flat metal bottom to provide gravity flow of liquid between both sides of the internal wall; and the internal wall comprising a plurality of interconnected insulating blocks constituting thermal insultion surrounded by a covering layer impervious and corrosion resistant to liquid to be stored in the tank, with said feeding continuing until the tank contains a layer of hot liquid within the internal wall and at least a layer of cold liquid in the annular space and along the flat metal bottom at least for the depth of the ports;
removing hot liquid from the tank in a volume equal to cold liquid fed to the tank so that the total liquid volume in the tank is about constant and substantially fills the tank; and
removing cold liquid from the tank in a volume equal to hot liquid fed to the tank until the layer of cold liquid at the bottom of the tank has a depth adequate for the thermocline to be above the ports so that thereby the hot liquid cannot flow from within the space surrounded by the internal wall, through the ports and into the annular space.

15. A method according to claim 17 in which the thermocline at the boundary separating the hot and cold liquid layers is always maintained above the ports.

16. An enclosed liquid storage tank for storing a liquid at a temperature above 400° C. comprising:
a metal shell with a flat metal bottom, a vertical cylindrical metal side wall and a metal roof;
a vertical circular cylindrical internal wall, supported by the tank bottom, axially located in the tank to provide an annular space between the tank side wall and the internal wall;
means to provide gravity flow of liquid between both sides of the internal wall;
the internal wall comprising a plurality of interconnected insulating blocks constituting thermal insulation surrounded by a covering layer impervious and corrosion resistant to liquid to be stored in the tank; and
a vent conduit communicating with the interior of each block and extending to above the maximum liquid level storage capacity of the tank.

17. An enclosed liquid storage tank according to claim 16 in which a single vent conduit communicates with a plurality of blocks.

18. An enclosed liquid storage tank according to claim 17 in which each block in communication with the conduit is in a separate ring.

19. An enclosed liquid storage tank for storing a liquid at a temperature above 400° C. comprising:
a metal shell with a flat metal bottom, a vertical cylindrical metal side wall and a metal roof;
a vertical circular cylindrical essentially freestanding internal wall, supported by the tank bottom, axially located in the tank to provide an annular space between the tank side wall and the internal wall;
means to provide gravity flow of liquid between both sides of the internal wall;
the internal wall comprising a plurality of interconnected insulating blocks constituting thermal refractory insulation surrounded by a covering layer impervious and corrosion resistant to liquid to be stored in the tank.

20. An enclosed liquid storage tank according to claim 19 in which the covering layer is metal.

21. An enclosed liquid storage tank according to claim 19 in which the insulation is a thermal foamed refractory insulation.

22. An enclosed liquid storage tank according to claim 19 in which the insulation is a cast refractory insulation.

23. An enclosed liquid storage tank according to claim 19 in which the covering layer of the blocks includes flat top and bottom metal plates and vertical corrugated metal walls.

* * * * *